(No Model.)

J. P. BARKER.
TWO WHEELED VEHICLE.

No. 394,751. Patented Dec. 18, 1888.

Witnesses.
John C. Perkins
John Reidsma

Inventor.
Jeduthum P. Barker
By Lucius C. West,
Atty.

UNITED STATES PATENT OFFICE.

JEDUTHEUN P. BARKER, OF KALAMAZOO, MICHIGAN, ASSIGNOR, BY DIRECT AND MESNE ASSIGNMENTS, TO GEORGE H. WINANS AND ARTHUR L. PRATT, OF SAME PLACE.

TWO-WHEELED VEHICLE.

SPECIFICATION forming part of Letters Patent No. 394,751, dated December 18, 1888.

Application filed February 29, 1888. Serial No. 265,677. (No model.)

*To all whom it may concern:*

Be it known that I, JEDUTHEUN P. BARKER, a citizen of the United States, residing at Kalamazoo, county of Kalamazoo, State of Michigan, have invented a new and useful Two-Wheeled Vehicle, of which the following is a specification.

This invention relates to an invention patented to me July 5, 1887, No. 366,063; and it has for its object certain improvements below described and claimed.

Figure 1:
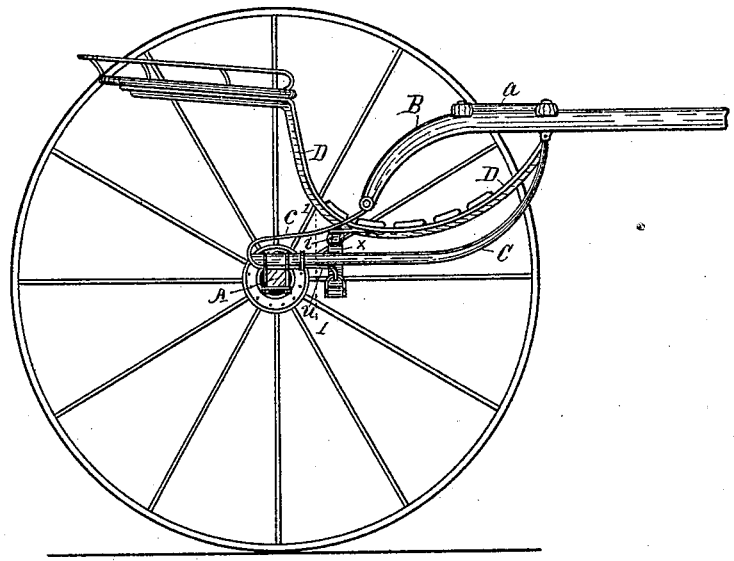
Figure 2:
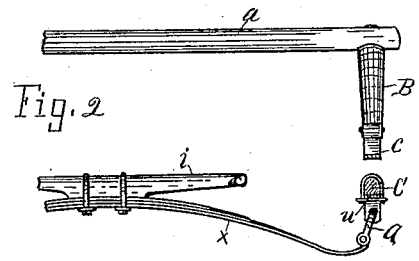

In the drawings forming a part of this specification, Figure 1 is a side elevation, one wheel being removed; Fig. 2, a rear elevation of lettered details, with parts in section on dotted line 1 1 in Fig. 1; and Fig. 3 shows lettered details enlarged from Fig. 1.

Referring to the lettered parts of the drawings, D is the body, fulcrumed at the forward end; $x$, a semi-elliptic spring with spring-bar $i$, supporting the body, substantially as heretofore. The thills B are the ordinary carriage-thills, with short shank, as shown in my prior patent above named, and C is a bar, also shown in said prior patent, attached at one end to the axle A, curved at the other end oppositely to the curve of the shank of the thill, and hinged to said thill, Fig. 1.

Figure 3:
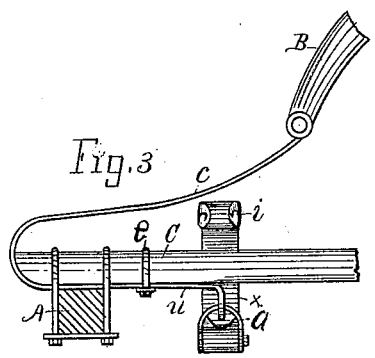

The spring C, which connects with the thill and axle in this instance, as well as in said prior patent, is here shown extended forward, as at $u$, Fig. 3. The spring is curved around the rear end of the bar C and lies between the bar and axle, so that the same clips bind the spring $c$ and the bar C to the axle. Forward of the axle the part $u$ of the spring is elastic, thus forming another spring, to the eyed end of which the loop $a$ is attached, which suspends the end of the spring $x$, Fig. 2. Thus the spring $x$ is elastically suspended at the ends when the clip $e$ is located at the rear of the eyed end of spring portion $u$; but by adjusting the clip $e$ one way and the other the degree of the elasticity of part $u$ is changed, and by moving said clip $e$ to the eyed end the part $u$ is made rigid, in which case, of course, the ends of the spring $x$ are not elastically supported. If preferred, the part $u$ may be made rigid in constructing the vehicle. In thus making a vehicle in which the semi-elliptic spring is employed said spring is not suspended from the thills nor the axle, as has been the case in some prior instances, and the spring being farther forward it has a less canting motion when the body swings down.

It will be understood that both sides of the vehicle are alike.

Having thus described my invention, what I claim, and desire to secure by Letters Patent, is—

1. The combination of the axle, the thills, body or seat bars, a supporting-spring, and the thill-springs attached to the axle and having one end extended forward and attached to the thill and the other end extended forward and suspending the ends of the supporting-spring, substantially as set forth.

2. The combination of the axle, the thills, the bowed bar attached to the thills at one end and to the axle at the other, the thill-spring attached to the thill and axle and having the forwardly-extended elastic end, and the supporting-spring suspended at the ends by said extended ends of the thill-spring, substantially as set forth.

3. The combination of the axle, the thills, the bowed bars, the supporting-spring, the thill-springs having the extended elastic ends suspending the ends of the supporting-spring, and the adjustable clips, substantially as set forth.

In testimony of the foregoing I have hereunto subscribed my name in presence of two witnesses.

JEDUTHEUN P. BARKER.

Witnesses:
GEORGE H. WINANS,
DANIEL S. PEMBROKE.